Nov. 12, 1935.    J. R. LEMON    2,020,951
HYDRAULIC STEERING SYSTEM
Filed May 20, 1933    2 Sheets-Sheet 1

INVENTOR.
JOSEPH R. LEMON.
BY
ATTORNEYS.

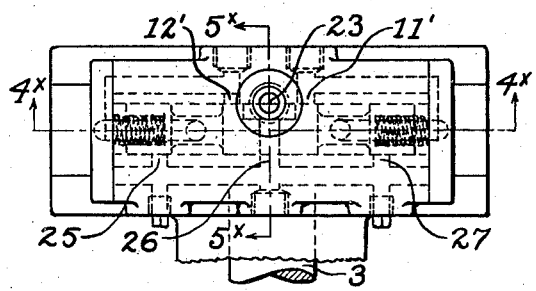
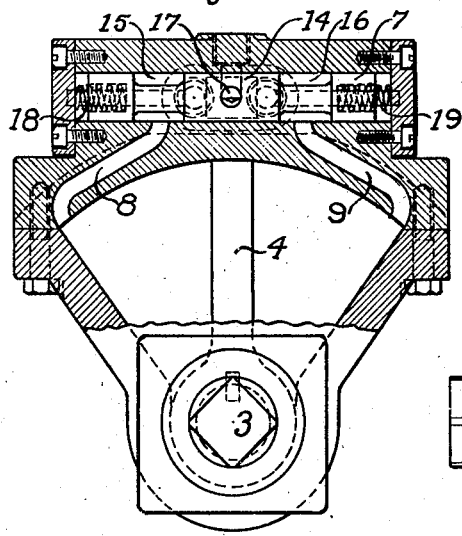
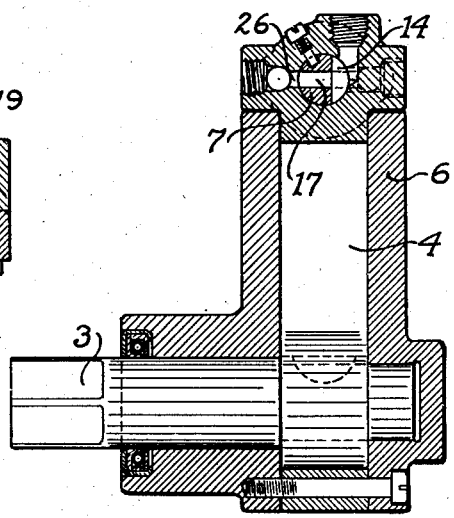

Patented Nov. 12, 1935

2,020,951

UNITED STATES PATENT OFFICE 2,020,951

HYDRAULIC STEERING SYSTEM

Joseph R. Lemon, Detroit, Mich.

Application May 20, 1933, Serial No. 672,027

22 Claims. (Cl. 60—52)

This invention relates to a steering gear for vehicles, more particularly of motor vehicles, where it is desirable that the steering be as effortless as possible in order to give maximum control, and the object of the invention is to provide for the utilization of the motive power of the vehicle in a system or in mainly effecting the actual movement of the steering mechanism so that manual means will serve principally to merely control the direction and extent of the steering movement.

A further object is to utilize as the medium of transmission of engine power to the steering mechanism, hydraulic fluid suitably controlled as to direction of flow and application of pressure by the steering wheel or equivalent part of the vehicle.

A further object is to provide a hydraulic circuit in which is interposed the steering device utilized as to direction of movement by direction of application of pressure in said circuit, and valve means operated and controlled by the steering wheel of the vehicle determining the direction of such application of pressure.

A still further object is to provide in an hydraulic power steering system, a selective valve device adapted by its movement to determine the direction of hydraulic pressure on a steering arm or lever, and means operated by the steering wheel of the vehicle through the hydraulic system effecting pressure on said valve to effect its selective movement in desired manner according to the direction of rotation of the steering wheel.

The invention also contemplates the provision of a pump operated by the engine to provide the required operating pressure of the hydraulic system, and means by-passing the discharge of said pump when the steering mechanism is inoperative.

Still further the invention provides for the operation of the hydraulic system entirely by the operation of the steering wheel in the event of the pump being inoperative due to failure or to the engine being inoperative.

Still further objects and advantages appertaining to or resulting from the construction or operation of the invention as it may be carried into effect will become apparent as the said invention is still further disclosed herein.

In carrying the invention into effect, I may provide a fluid transfer device or reversing pump and series of ducts connecting said ducts with a steering gear actuator through the medium of a selective valve movable to select a directional flow through said ducts as the direction of such flow is initially instigated by the manual operations in one or other direction of said pump by a steering wheel connected thereto, and a power pump or fluid pressure producing device impressing a pressure on the fluid in the direction of the flow initiated through said transfer pump whereby such pressure serves mainly to operate said actuator in addition to the manual power applied to said steering wheel. All of which is more particularly described and ascertained hereinafter, having reference, by way of example, to the accompanying drawings, wherein:

Fig. 3 is a plan of the actuator.

Fig. 4 is a detail sectional view of said actuator taken on the line 4$^x$—4$^x$, Fig. 3; and Fig. 5 is a detail sectional view of the same taken on the line 5$^x$—5$^x$ of Fig. 3.

Similar characters of reference indicate similar parts in the several figures of the drawings.

Figure 1:
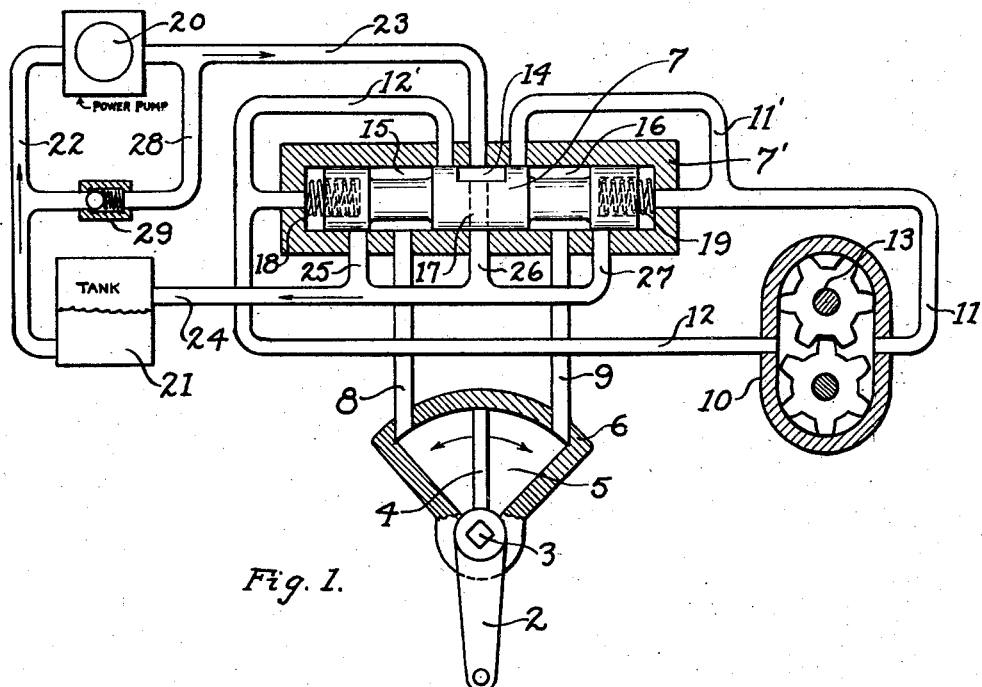
Figure 1 is a diagrammatic sketch of my system.
Figure 2:
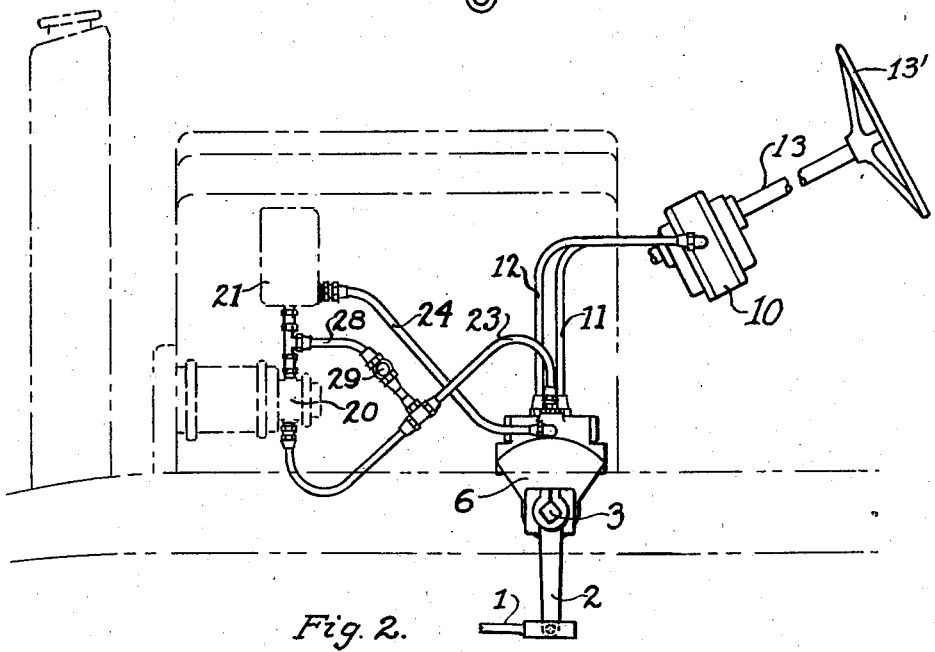
Figure 2 is an assembly view showing the general arrangement of the system applied to a car.

1 indicates a steering rod such as is usual in the manual type of steering gear in common use, the reciprocating of which rod causes, through suitable linkage (not shown) the movement of the vehicle wheels in the manner well understood. The present system includes an arm 2 coupled to said rod and mounted on the end of a shaft 3 which carries a piston or vane 4 swingable in the segmental chamber 5 of a casing 6. These members, 2 to 6 inclusive, form a hydraulic motor or actuator for operating said rod 1 and steering the vehicle to which it is applied.

The operation of the actuator is, in turn, controlled by the movement of a piston valve 7 traversing ducts 8 and 9 which open to the chamber 5 on opposite sides of the vane 4. When the valve 7 is moved to the left the duct 9 becomes the inlet duct of the actuator and the duct 8 the outlet duct, and when the said valve is moved in the opposite direction this relationship of the ducts is reversed, as will be more fully explained.

The reciprocating of the valve 7 in its casing 7' results upon the initial operation of a gear pump 10 (hereinafter called the transfer pump) in one or other direction whereby, through the ducts 11 or 12, as the case may be, hydraulic pressure is applied to one or other end of the said valve; and as one of the gears of said pump 10 is mounted on the end of the steering shaft 13, rotation of the steering wheel 13' provides through the said pump 10 and its connections the required selective movement of said valve. Continued rotation of the steering wheel results in the imposing of hydraulic pressure on the so-selected side of the vane 4 and the consequent actuation of the steering mechanism in the desired direction.

In more particularly describing the hydraulic circuit attention is drawn to the valve as having a recess or longitudinal port 14 in one side thereof and intermediate its length as well as annular recesses or ports 15 and 16 situated toward the ends of said valve. A transverse port 17 passes through said valve from said recess 14. The valve 7 is normally centered longitudinally in its casing by springs 18 and 19.

The ducts 11 and 12, previously referred to, connect opposite sides of said gear pump 10 with the right and left hand ends respectively of said valve casing 7', and the actuator ducts 8 and 9 communicate through said casing 7' with the ports 15 and 16 of said valve. Branches 11' and 12' of said ducts 11 and 12 also enter said casing 7' in such relation that when the valve 7 is moved to the left the branch 11' opens into the annular port 16, and similarly when the valve is moved to the right the branch 12' opens into the annular port 15, these branches being closed in the intermediate position of the said valve 7 as will be readily seen in Figures 1, 3 and 4.

20 is a hydraulic pump of any suitable type, (hereinafter called the "power pump") preferably operated by the vehicle engine and receiving its supply from a fluid storage tank 21 through the pipe 22. Pump 20 discharges through pipe 23 which communicates with the valve port 14. 24 is a return pipe to the tank 21, said return pipe having three branches 25, 26 and 27 entering same. The branches 25 and 27 communicate respectively with the annular valve port 15 when the valve is moved to the left and with port 16 when the valve is moved to the right, whilst the branch 26 coincides with the transverse port 17 when the valve is in the intermediate position.

The operation is as follows: Clockwise rotation of the steering wheel initially moves fluid in the duct 11 against the right hand end of valve 7 moving said valve to its left hand position wherein branch 11' communicates through annular port 16 with actuator duct 9 so that continued rotation of steering wheel causes the discharge of gear pump 10 to move the vane 4 of the actuator to the left in its case whereby the arm 2 of the steering gear is swung to the right for right hand steering of the vehicle. Supply to the gear pump during this operation is under pressure from the power pump 20 through the medium of pipe 23, port 14, duct branch 12', and duct 12. Thus, pressure is applied to the fluid on the intake side of the transfer pump 10, assisting in the turning of the steering wheel and building up in the discharge line 11 of said transfer pump a like pressure augmented by the manually applied power to operate the vane of the actuator.

At the same time discharge from the actuating chamber on the opposite side of the vane 4 passes through the duct 8, port 15, and branch 25 of the return pipe 24 to the tank 21.

Reverse or anti-clockwise rotation of the steering wheel similarly moves the valve 7 to the right establishing communication between the duct branch 12' and duct 8 with consequent impelling of the vane 4 to the right, accompanied by discharge from the actuator casing through duct 9, port 16, and branch 27 of the said return pipe 24 for left hand steering of the vehicle as will be readily apparent from the drawings.

To render the described system independent of the operation of the engine and incidentally of the power pump 20, I have provided a by-pass at 28 around said pump, this by-pass being provided with a check-valve 29 whereby, when said pump 20 is not operating, the actuation of the transfer pump in a solely manual manner will result in the intake of said transfer pump being derived from the tank 21 through the medium of the said check-valve.

When no manual effort to turn the steering wheel is applied, the valve 7 assumes its intermediate position by virtue of the fluid action from the duct 23 to ducts 11' and 12', and 11 and 12, acting on the ends of the valve 7 as well as by the action of the springs 18 and 19, and in this position the power pump simply discharges through the transverse port 17 of the valve and branch 26 of the return pipe 24 into the tank 21 without transmitting power either to the transfer pump and its connections on to the actuator. Further, under these conditions and position of the said valve 7 it will be seen that the duct branches 11' and 12' being closed, the vane 4 is locked in position by the trapped fluid on either side thereof. Thus, if it be presumed that the steering wheel is brought to a stop from, say, a clockwise movement, the pressure in line 12, 12' will build up, due to operation of the power pump 20, and this excess pressure will move the valve 7, assisted by the spring 18, back to its central position indicated in Figure 1, thereby locking the vane in the position which it may have assumed by that time.

This action of excess pressure on the valve 7 also serves to provide automatic pressure regulation of fluid acting on the piston 4 of the actuator 6, due to the fact that any pressure built up in the lines 11' or 12', in excess of that required to move the pistons against whatever resistance may be offered, serves to react on one or other end (as the case may be) of the valve 7 and more or less close the ports. This automatic restricting of the valve opening prevents snapping over of the piston to one or other side of its chamber 5.

It should also be noted that the reversing pump 10 may be said to "meter" fluid to the lines 11 or 12, and that pressure from the power pump is not opened directly against the piston 4 but indirectly through the same reversing pump 10.

It will be obvious that a hydraulic power steering gear such as that described may be operated with great nicety of control and with a minimum of manual effort, at the same time being free from entire dependence on the source of power. The self-locking feature of the system, when steering is not actually being effected, effectually prevents transmission of road shocks to the steering wheel and ensures a very desirable non-reversible condition.

The single automatic valve, free from mechanical connections or any necessity of pre-setting or other direct manual operation eliminates a human element forming a drawback to many hydraulic mechanisms having hand or foot operated valves or selecting devices. It should be understood that the term "power pump" as used herein and in the claims is intended to include any device for supplying fluid under pressure to the fluid lines.

This invention may be developed within the scope of the following claims without departing from the spirit of the said invention, and it is desired that the specification and drawings be read as being merely illustrative and not in a limiting sense, except as necessitated by the prior art.

What I claim is:—

1. In a device of the class described, a steering gear actuator, a gear-operating piston in said actuator, a power pump adapted to impress hydraulic pressure on said piston in one or other direction, a selector valve determining the direction of application of said pressure, a steering wheel, and means operated by the rotation of said wheel in one or other direction effecting the selective movement of said valve, said means being also adapted to impress hydraulic pressure on said piston in one or other direction as determined by the selective movement of said valve.

2. In a device of the class described, a steering gear actuator, a gear-operating piston in said actuator, a power pump adapted to impress hydraulic pressure on said piston in one or other direction, a selector valve determining the direction of application of said pressure, a steering wheel, and a hydraulic reversing pump operated by the rotation of said wheel in one or other direction effecting the selective movement of said valve, said reversing pump being also adapted to impress hydraulic pressure on said piston in one or other direction as determined by the selective movement of said valve.

3. In a device of the class described, a steering gear actuator, a gear-operating piston in said actuator, a selector valve determining the direction of application of hydraulic pressure on said piston, a steering wheel, and a hydraulic reversing pump operated by the rotation of said wheel in one or other direction effecting the selective movement of said valve and impressing hydraulic pressure on said piston, and a power pump adding to the operating pressure on said piston, said valve being ported to direct flow from said booster pump against the pressure side of said piston.

4. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable by the initial operations of said pump in either of its directions, and a steering wheel operating said pump, and a power pump discharging through said valve also to the pressure side of said piston.

5. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable hydraulically by the initial operation of said pump in either of its directions, and a steering wheel operating said pump, and a power pump discharging through said valve also to the pressure side of said piston.

6. In a device of the class described, a steering gear actuator, a gear-operating piston in said actuator, ducts entering said actuator on opposite sides of said piston, a reversing pump, a valve interposed between the inlet and outlet of said pump, said valve being movable, by initial flow in one or other direction through said pump, to establish communication between one or other side of said pump with one or other of said ducts, a steering wheel operating said pump, and a power pump discharging through said valve also to the pressure side of said piston.

7. In a device of the class described, a steering gear actuator, a gear-operating piston in said actuator, ducts entering said actuator on opposite sides of said piston, a reversing pump, a steering wheel operating said pump, a valve interposed between the inlet and outlet of said pump, said valve being movable by initial flow in one or other direction through said pump, to establish communication between one or other side of said pump with one or other of said ducts whereby flow from said pump acts on the pressure side of said piston, a power pump directing its flow to the inlet side of said reversing pump, and means directing fluid pressure in excess of that required to operate said piston against said valve in a direction opposed to that of said initial flow to reduce the opening of said valve and the flow to said actuator.

8. In a device of the class described, a steering gear actuator, a gear-operating piston in said actuator, ducts entering said actuator on opposite sides of said piston, a reversing pump, a steering wheel operating said pump, a valve interposed between the inlet and outlet of said pump, said valve being movable by initial flow in one or the other direction through said pump, to establish communication between one or other of said ducts, a power pump adding to the operating pressure on said piston, the movement of said valve regulating the pressure from said power pump, said valve being ported to direct the flow from said power pump against the pressure side of said piston.

9. In a device of the class described, a steering gear actuator, a gear-operating piston in said actuator, ducts entering said actuator on opposite sides of said piston, a reversing pump, a steering wheel operating said pump, a valve interposed between the inlet and outlet of said pump, said valve being movable by initial flow in one or the other direction through said pump, to establish communication between one or other of said ducts, a power pump directing its flow to the inlet side of said reversing pump and adding through said reversing pump, to the operating pressure on said piston, the movement of said valve regulating the pressure from said power pump, said valve being ported to direct the flow from said power pump against the pressure side of said piston.

10. In a device of the class described, a steering gear actuator, a gear-operating piston in said actuator, ducts entering said actuator on opposite sides of said piston, a reversing pump, a steering wheel operating said pump, a valve interposed between the inlet and outlet of said pump, said valve being movable by initial flow in one or the other direction through said pump, to establish communication between one or other of said ducts, a power pump, flow from said power pump being directed through said valve to the intake side of said reversing pump, adding to the operating pressure on said piston, the movement of said valve regulating the pressure from said power pump, said valve being ported to direct the flow from said power pump against the pressure side of said piston.

11. In a device of the class described, a steering gear actuator, a gear-operating piston in said actuator, ducts entering said actuator on opposite sides of said piston, a reversing pump, a steering wheel operating said pump, a valve interposed between the inlet and outlet of said pump, said valve being movable by initial flow in one or other direction through said pump to establish communication between one or other side of said pump with one or other of said ducts, flow from said pump acting on the pressure side of said piston, and a power pump, flow from said power pump being directed through said valve to the intake side of said reversing pump, adding to the operating pressure on said piston.

12. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable hydraulically by the initial operation of said pump in either of its directions, a steering wheel operating said pump, a power pump directing its flow to the inlet side of said reversing pump, means directing fluid pressure in excess of that required to operate said piston against said valve in a direction opposed to that of said initial flow to reduce the opening of said valve and flow to said actuator, and a one way by-pass valve between the inlet side and pressure side of said power pump.

13. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable hydraulically by the initial operation of said pump in either of its directions, a steering wheel operating said pump, a power pump directing its flow to the inlet side of said reversing pump and adding, through said reversing pump to the operating pressure on said piston, and a one way by-pass between the inlet side and pressure side of said power pump.

14. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable hydraulically by the initial operation of said pump in either of its directions, a steering wheel operating said pump, a power pump, flow from said power pump being directed through said valve to the intake side of said reversing pump, adding to the operating pressure on said piston, and a one way by-pass valve between the inlet side and pressure side of said power pump.

15. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable hydraulically by the initial operation of said pump in either of its directions, a steering wheel operating said pump, a power pump, flow from said power pump being directed through said valve to the intake side of said reversing pump, adding to the operating pressure on said piston, the movement of said valve regulating the pressure from said power pump, means directing fluid pressure in excess of that required to operate said piston against said valve in a direction opposed to that of said initial flow to reduce the opening of said valve and flow to said actuator and a one way by-pass valve between the inlet side and pressure side of said power pump.

16. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable hydraulically by the initial operation of said pump in either of its directions, a steering wheel operating said pump, a power pump directing its flow to the inlet side of said reversing pump and adding, through said reversing pump to the operating pressure on said piston, the movement of said valve regulating the pressure from said power pump, and a one way by-pass between the inlet side and pressure side of said power pump.

17. In a device of the class described, a steering gear actuator, a gear-operating piston in said actuator, ducts entering said actuator on opposite sides of said piston, a reversing pump, a valve movable to establish communication between one or other side of said reversing pump with one or other of said ducts, said valve being movable hydraulically by the initial operation of said pump in either of its directions, a steering wheel operating said pump, a power pump, flow from said power pump being directed through said valve to the intake side of said reversing pump, adding to the operating pressure on said piston, the movement of said valve regulating the pressure from said power pump, and a one way by-pass valve between the inlet side and pressure side of said power pump.

18. Motion transmitting means comprising, in combination, a hydraulic cylinder, a piston therein, ducts entering said cylinder on opposite sides of said piston, a reversible fluid transfer mechanism, a valve interposed between the intake and delivery sides of said mechanism, said valve being movable by initial flow in one or other direction through said mechanism to direct flow from said transfer mechanism to one or other side of said piston, a fluid pressure producing device discharging through said valve to the intake side of said transfer mechanism, and means for operating said transfer mechanism.

19. Motion transmitting means comprising, in combination, a hydraulic cylinder, a piston therein, ducts entering said cylinder on opposite sides of said piston, a reversible fluid transfer mechanism, a valve interposed between the intake and delivery sides of said mechanism, said valve being movable by initial flow in one or other direction through said mechanism to direct flow from said transfer mechanism to one or other side of said piston, a fluid pressure producing device directing its flow to the intake side of said transfer mechanism, means directing fluid pressure in excess of that required to operate said piston against said valve in a direction opposed to that of said initial flow to reduce the opening of said valve and the flow to said hydraulic cylinder, and means for operating said transfer mechanism.

20. Motion transmitting means comprising, in combination, a hydraulic cylinder, a piston therein, ducts entering said cylinder on opposite sides of said piston, a reversible fluid transfer mechanism, a valve interposed between the intake and delivery sides of said mechanism, said valve being movable by initial flow in one or other direction through said mechanism to direct flow from said transfer mechanism to one or other side of said piston, and a fluid pressure producing device directing its flow to the intake side of said fluid transfer mechanism.

21. Motion transmitting means comprising, in combination, a hydraulic cylinder, a piston therein, ducts entering said cylinder on opposite sides of said piston, a reversible fluid transfer mechanism, a valve interposed between the intake and delivery sides of said mechanism, said valve being movable by initial flow in one or other direction through said mechanism to direct flow from said transfer mechanism to one or other side of said piston, and a fluid pressure producing device discharging through said valve to the intake side of said transfer mechanism.

22. Motion transmitting means comprising, in combination, a hydraulic cylinder, a piston therein, ducts entering said cylinder on opposite sides of said piston, a reversible fluid transfer mechanism, a valve interposed between the intake and delivery sides of said mechanism, said valve being movable by initial flow in one or other direction through said mechanism to direct flow from said transfer mechanism to one or other side of said piston, means directing fluid pressure in excess of that required to operate said piston against said valve in a direction opposed to that of said initial flow to reduce the opening of said valve and the flow to said hydraulic cylinder, a fluid pressure producing device discharging through said valve to the intake side of said transfer mechanism, and means for operating said transfer mechanism.

JOSEPH R. LEMON.